June 14, 1966    R. H. JOSEPHSON ETAL    3,256,049
SLIDING SURFACE BEARING

Filed Sept. 13, 1963    3 Sheets-Sheet 1

INVENTORS
ROBERT H. JOSEPHSON
JOHN E. STRICKLIN

BY *Eber J. Hyde*

ATTORNEY

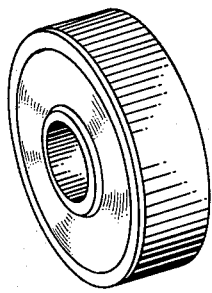
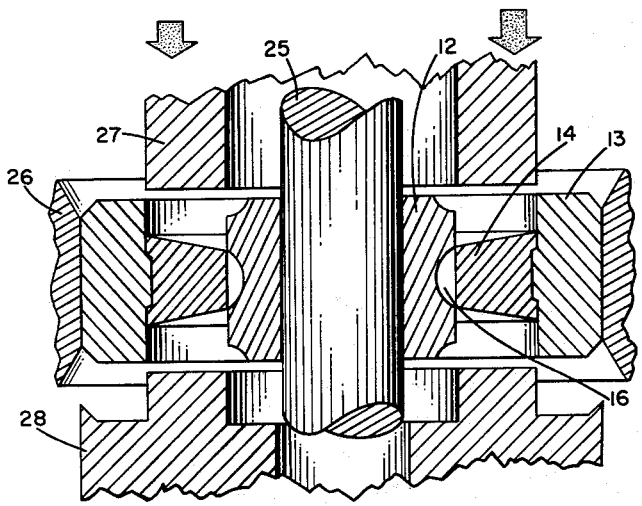
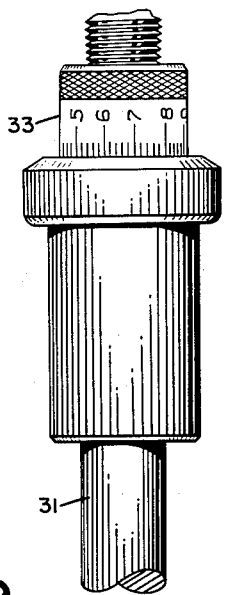
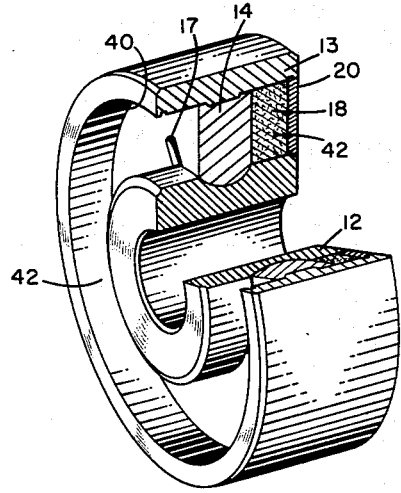
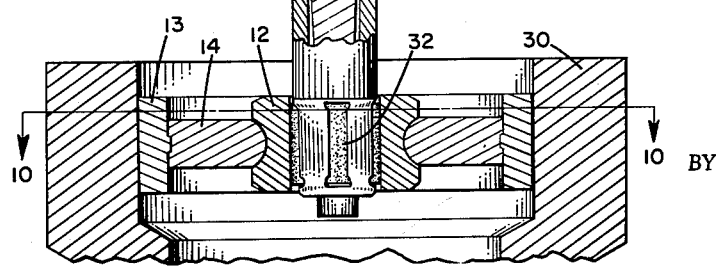
FIG.6
FIG.8
FIG.9
FIG.7
INVENTORS
ROBERT H. JOSEPHSON
JOHN E. STRICKLIN
BY
ATTORNEY June 14, 1966 R. H. JOSEPHSON ETAL 3,256,049
SLIDING SURFACE BEARING Filed Sept. 13, 1963 3 Sheets-Sheet 3

INVENTORS
ROBERT H. JOSEPHSON
JOHN E. STRICKLIN
BY
*Eber J. Hyde*
ATTORNEY

United States Patent Office 3,256,049
Patented June 14, 1966

3,256,049
SLIDING SURFACE BEARING
Robert H. Josephson, Cleveland Heights, and John E. Stricklin, Mentor, Ohio, assignors to Clevite Corporation, a corporation of Ohio
Filed Sept. 13, 1963, Ser. No. 308,863
14 Claims. (Cl. 308—36.1)

This invention pertains to a sliding surface, hydrodynamically lubricated bearing, which bearing may be an open bearing, or it may be a self-contained or package bearing wherein the life-time lubricant supply is sealed into the bearing. The invention also pertains to the method of making such a sliding surface bearing. A self-contained bearing involves the fabrication and assembly of substantially all components which affect its performance and the open bearing has one less factor under its control; however, both types have all of the sliding surface components carefully controlled.

In the past there have been two distinctly different broad types of bearings each of which had its own field of use, and the fields did not appreciably overlap one another. These two broad types of bearings are known as the rolling contact bearing (sometimes erroneously called anti-friction bearings) and the sliding surface or sleeve bearing (sometimes erroneously called a friction bearing).

It is an object of the present invention to provide a sliding surface bearing of a given size, and the method for making same, wherein the bearing will replace a rolling contact bearing such as a ball bearing of the same or larger size, and will out-perform the rolling contact bearing in many important factors.

Some of the important factors wherein the present sliding surface bearing outperforms a ball bearing of the same size are the following:

(1) The fatigue characteristics of the sliding surface bearing of this invention are extremely good because it may have only one moving part, and when the bearing is unidirectionally loaded the bearing material is always stressed in the same direction, in contrast to a rolling contact bearing, and the amount of this load does not fluctuate cyclically as in a rolling contact bearing. For a given load and speed the cyclic stress level in a ball bearing might be 250,000 p.s.i.; whereas, in the bearing of the present invention there is no cyclic stress on the bearing material.

(2) The bearing of the present invention is much more tolerant to dirt than is a rolling contact bearing.

(3) The noise level of the present bearing is very low compared to the noise level of rolling contact bearings, especially at the higher frequencies because of the absence of microgeometry effects associated with rolling elements.

(4) The sliding surface bearing of the present invention can be made with corrosion resistant and/or non-magnetic inner and outer races with substantially no loss in load and/or fatigue characteristics; whereas, when a ball bearing is made corrosion resistant by the use of stainless steel races, its fatigue life goes down by a significant factor.

All rolling contact bearings are detrimentally affected by shock loads which are transmitted from one race to the other through the rolling contact elements. The bearing of the present invention is not nearly so subject to damage due to shock loads because of a thin oil film which is always present during proper operating conditions.

While some of these advantages are shared with the well known sleeve bearing which is much larger in size, for a given load, than the present sliding surface bearing, the bearing of this invention has numerous advantages over the sleeve bearing. Among them are:

(1) The present bearing is much more accurate than the sleeve bearing.

(2) It is much smaller than the usual sleeve bearings for a given load.

(3) The engineer who uses the bearing can select a shelf item, similar to the selection of a proper rolling contact bearing.

(4) The present bearing may be self-contained, i.e., it may have its own built-in lifetime supply of oil, often leading to greatly reduced cost by eliminating an oil flow system.

(5) The present bearing is independent of the shaft material and finish.

The present bearing is not a self-aligning bearing like a rod-end bearing, but because of its short length compared to the usual sleeve bearing and because of its contour it has a degree of self alignment ability which can exceed or be comparable to a ball bearing. This limited ability, however, is far superior to the self alignment ability of prior art sleeve bearings.

The present bearing will take thrust on its regular bearing surface, and thus extra flange bearing surfaces are not needed, thereby greatly reducing the cost of a sliding surface bearing which will take a certain degree of thrust load.

The bearing of the present invention has lower friction losses than prior art sleeve bearings, and in certain ranges of speed and load conditions it may have lower friction losses than comparable ball bearings.

In conventional wick-fed or self-lubricating sleeve bearing technology, a limit of approximately 100–200 p.s.i. cannot be exceeded at 200–500 ft. per minute. However, in the described invention it is possible to reliably operate at least 10–20 times this normal loading. This result is obtained because of the unique combination of bearing structure and microgeometry of that structure. This bearing configuration provides the ability to operate at extremely thin oil film thicknesses with resultant minimum heat generation and maximum load-carrying capacity.

These characteristics in combination with the bearing structure and a material providing maximum heat transferability as well as excellent anti-seizure boundary characteristics under thin film conditions result in operating characteristics far beyond prior art sleeve bearings. Because the described high performance level can be maintained with substantially hydrodynamic operation, no deterioration, such as wear or fatigue of the bearing occurs. Thus, the bearing life is limited only by its lubricant supply in contrast to rolling contact bearings with their inherent fatigue life limitations.

Thus, there is provided, for the first time, a sliding surface bearing whose size is comparable to or smaller than a ball bearing, and which will carry for longer periods loads comparable to or exceeding loads carried by the ball bearing.

A measure of performance for self-lubricating sliding surface bearings is called the PV rating. This rating is the product of the load in pounds per square inch multiplied by the surface velocity in ft./min. Typical PV ratings for various kinds of bearings are as follows:

| | |
|---|---:|
| Nylon bearing | 2,000–5,000 |
| "Teflon" bearing | 5,000–15,000 |
| Porous oil filled bronze | 50,000–75,000 |
| Wick-lubricated sleeve bearing | 100,000–200,000 |
| The sliding surface, hydrodynamically lubricated bearing of the present invention | 2,000,000–5,000,000 |

In installations having a certain amount of air circulation, as in an automobile generator, PV ratings of 10,000,000 have been reached. Prior art bearings do not have the ability to take the generated heat away to a location where fan circulation of air will do much good.

An object of the present invention is to provide a sliding surface bearing which is hydrodynamically lubricated, which bearing is in many respects which have been listed above, superior to a rolling contact bearing, and which is also in many respects, above listed, superior to conventional sleeve bearings.

An object of the present invention is to provide a sliding surface bearing which is hydrodynamically lubricated, which bearing is in many respects which have been listed above, superior to a rolling contact bearing, and which is also in many respects, above listed, superior to a sleeve bearing.

Another object of the invention is to provide a new and novel method of making a high performance, relatively inexpensive, sliding surface bearing.

Another object of the invention is to provide a sliding surface bearing, and the method of making same, which is inexpensive, which has a high PV rating, which will take thrust, which has excellent fatigue and corrosion resistant properties, and which has very low heat generating characteristics and which has very high load-carrying capacity.

Still another object of the invention is to provide the method of making a sliding surface bearing wherein the races and the bearing material are economically formed to very close tolerances which result in a capability of operating with very thin oil film for hydrodynamic lubrication, with consequent low heat generation and high load capacity.

Another object of the invention is to provide a high speed, high load bearing which is very low in its noise and vibration generation, especially at higher speeds, and which has no cyclic stress in the bearing material resulting in excellent fatigue characteristics.

One aspect of the invention lies in the provision of a sliding surface self-contained or package bearing for use with an axially extending shaft, wherein there is provided a cylindrical inner bearing race member and annular outer bearing race member means around the inner race. The outer of these two races is formed at least in part of metallic base bearing material which is located closely adjacent to the inner race to establish a bearing interface. This interface, when the bearing is running, is hydrodynamically lubricated, and a supply of lubricant is sealed into the bearing, and the sealing means exclude dirt which would be harmful to the operation of the bearing. The metallic base bearing material forms a substantially solid heat transfer path from the bearing interface to the outer race means.

Another aspect of the invention lies in the method of making a sliding surface bearing wherein there is provided an inner bearing race and an outer bearing race around the inner race. The inner race has a raceway such as a groove in its face which is opposite the outer race, and the outer race is formed at least in part of metallic base bearing material which is more readily formable than the material of the inner bearing race. This bearing material is located immediately around the raceway in the inner race. The bearing material is deformed to cause it to flow radially into the groove in the inner race to lock the two races together against axial movement in respect to each other. Thereafter one or both of the race means is deformed within its elastic limit to stress the bearing material beyond its elastic limit to establish a small, carefully controlled, finite clearance at the raceway to free the bearing for rotary motion of one race in respect to the other race.

For a better understanding of the present invention, together with other and further objects thereof, reference is had to the following description taken in connection with the accompanying drawings, and its scope will be pointed out in the appended claims.

Figure 4:
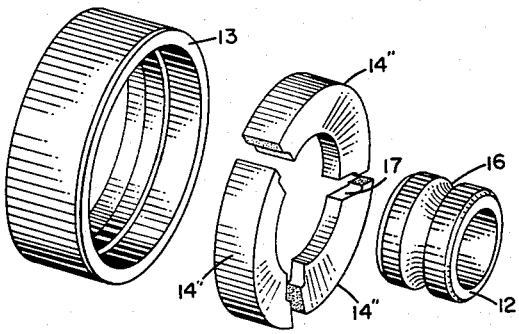
FIGURE 4 is an exploded view showing a modified form of the bearing before coining wherein the ring of bearing material may be comprised of several parts.
Figure 5:
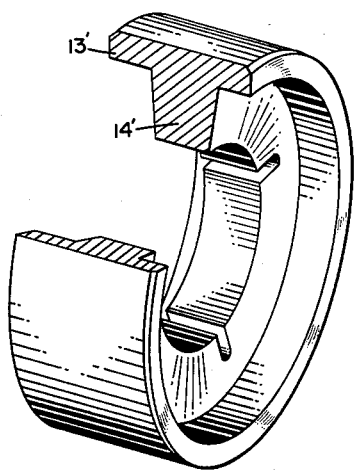
Figure 4A:
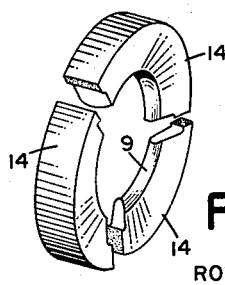
Figure 10:
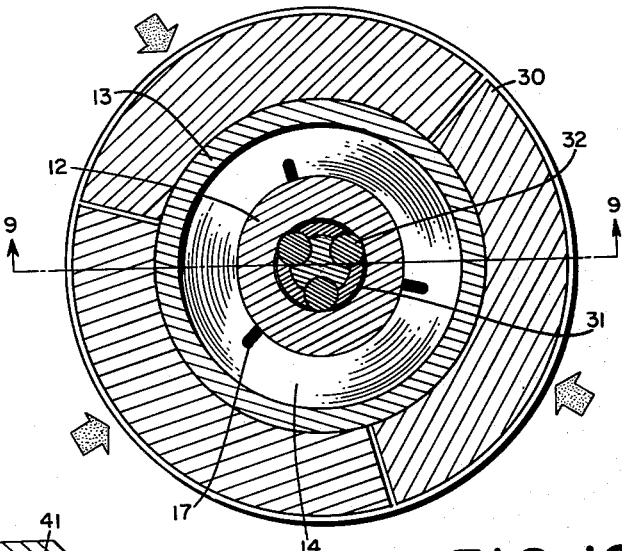
Figure 11:
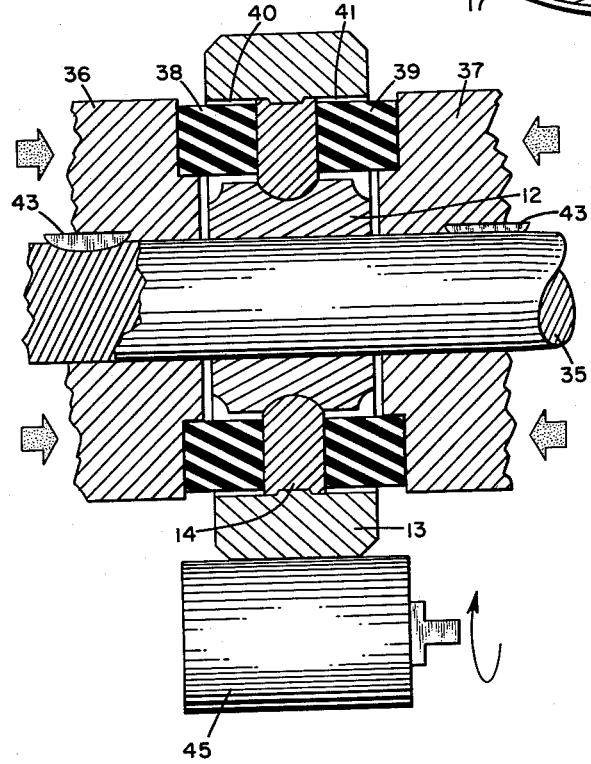

FIGURE 4-A is a view of still another form of the bearing ring after fabrication;

FIGURE 5 is an isometric, partially broken away, view of another form of the bearing where the outer race and the ring of bearing material are integral; this view shows the integral race and ring prior to final shaping;

FIGURE 6 is an isometric view showing the assembled bearing;

FIGURE 7 is an isometric, partially broken away view, showing the assembled bearing with one seal removed and with some of the lubricant removed to show the interior;

FIGURE 8 is a sectional view taken through apparatus which is assembling the bearing;

FIGURE 9 is a sectional view taken along line 9—9 of FIGURE 10 showing the step in the process of making the bearing wherein the inner race is expanded to provide running clearance in the bearing;

FIGURE 10 is a sectional view taken along line 10—10 of FIGURE 9 showing, to an exaggerated extent, the distortion of the inner race to obtain running clearance; and FIGURE 11 is a sectional view showing another way of obtaining running clearance in the bearing.

Figure 1:
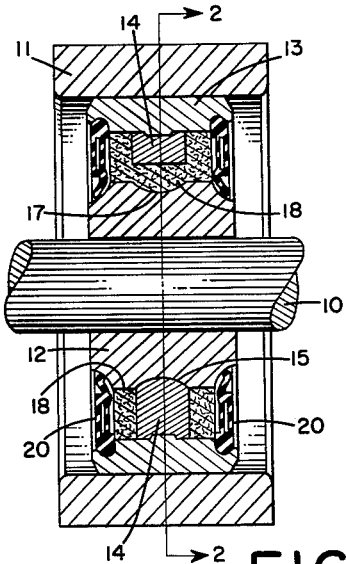
FIGURE 1 is a cross-sectional view taken along line 1—1 of FIGURE 2, showing a bearing embodying the invention mounted between a shaft and a housing.
Figure 2:
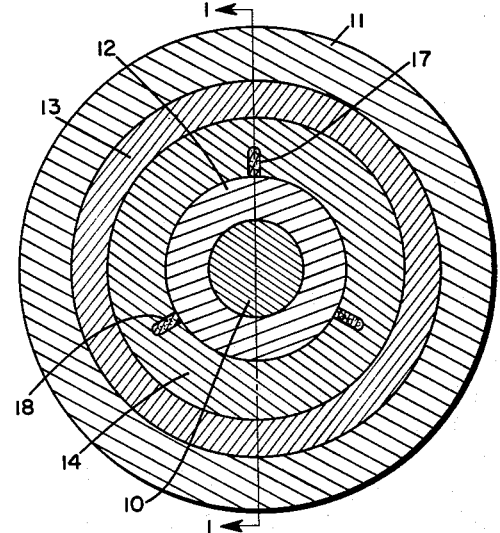
FIGURE 2 is a sectional view taken along line 2—2 of FIGURE 1.

With reference to the drawings, FIGURES 1 and 2 show the bearing of this invention mounted on a shaft 10 and within a housing 11, a typical bearing installation.

The bearing is an integrated assembly which comprises cylindrical inner bearing race member means 12 and an annular outer bearing race member means 13 around the inner race 12. A ring of bearing material 14 is positioned between the inner and outer races. As shown in FIGURE 1 the ring 14 of bearing material is effectively connected to the outer race 13 and its inner face 15 forms a sliding surface bearing interface with the inner race 12. There is a very small, carefully controlled, finite space at the bearing interface between the bearing ring 14 and the inner race. Preferably the inner race has a groove 16 (see FIGURE 4) into which the bearing material 14 extends. This permits the bearing to take axial thrust and locks the inner race and the outer race together against axial motion while allowing for a small degree of self-alignment. The method of forming the bearing material into the groove is hereafter fully described. The ring 14 of bearing material preferably has a plurality of slots 17 in its inner face 15, and the slots are filled with a lubricating material such as grease or oil-soaked wicking material 18. Thus, the lubricant such as the wicking material 18 is in engagement with the load bearing face of the inner race 12. The axial length of the ring 14 of bearing material is shorter than the axial length of the inner and outer races 12, 13 establishing annular spaces at each side of the ring 14, and these spaces are filled with the lubricant such as the oil-soaked wicking material 18. Thus the wicking material in the slots 17 is in engagement with the relatively large masses 18 of the wicking material positioned against the edge faces of the bearing ring 14, as shown in the upper half of FIGURE 1.

It has been found that with a lubricant filled wicking material properly disposed, that the lubricant is recirculated through a continuous supply and scavenging path, consisting of wick-filled slots in the bearing surface, connected to the annular wick-filled spaces adjacent thereto. The oil in the wicking material in the slots is wiped on the journal, finds its way or is squeezed to the outer edges of the running surface where it is absorbed by the juxtaposed wicking material from where it is "wicked" back to the material in the slots. The annular spaces which are wick-filled further distribute the oil circumferentially, which counters the natural action of hydrodynamic operation which tends to unbalance the circumferential oil distribution by drawing oil from the unloaded area and discharging excess oil adjacent the highly loaded areas.

Sealing means 20 are mounted between the inner and outer races to hold the wicking material in place and to keep dust and dirt out of the bearing. The sealing means may comprise a metal shield forced into engagement with the outer race and it may have a slight clearance at the inner race, or it may comprise a rubber sealing ring mounted on one of the races and in highly loaded engagement with the other race.

As shown in FIGURES 1 and 2 the ring 14 of bearing material may be a piece separate from the inner and outer races 12, 13. However, one of the bearing race means, preferably the outer race, may be formed of bearing material and in that event a separate bearing ring is not needed. As shown in FIGURE 5 the outer race 13' and the bearing ring 14' are integral, being formed of a material which is suitable for bearing applications. An inner race similar to the inner race 12 is provided for the device shown in FIGURE 5. The ring 14' is formed into the groove 16 in the inner race, as will hereafter be described, and the device contains lubricant such as grease or oil-soaked wicking material and is sealed as described in connection with the device shown in FIGURE 1.

In some specific applications it may be preferable not to use a one piece annulus of bearing material. In such applications a multi-segmented annulus may be used with some consequent disadvantages such as reduction of dimensional integrity, reduction in heat transferability, increased cost and increased complexity.

FIGURE 4 shows a ring of bearing material which is made of three separate parts 14" forming effectively a complete annulus. The inner race 12 and the outer race 13 and the other portions of the bearing are the same as that shown in FIGURE 1. If a split ring is to be used it is convenient, though not essential, to divide the ring at the slots 17. FIGURE 4–A shows another form of the bearing ring. It is split into a plurality of segments as in the device shown in FIGURE 4. However, since it is split into segments the bearing material need not be forced into the groove 16 in the inner race during the assembly process as is hereafter described in connection with the formation of a solid one piece annulus of bearing material. In the device shown in FIGURE 4–A the inner face 9, which together with the face of groove 16 forms the bearing interface, is carefully formed to match the raceway of the inner race, such, for example, as the groove 16 prior to assembly. The segments are then assembled into the inner race 16 and the outer race 13 is then applied around the bearing ring.

Since the bearing of the present invention is primarily designed to replace the common rolling contact bearing it has a complete annulus or ring 14 of bearing material, and it can be mounted between a shaft 10 and a housing 11 without any regard to position; i.e., there is no requirement to keep a certain portion of the bearing above the shaft. The bearing has only one moving part. The inner race 12 rotates with the shaft 10. The bearing ring 14 does not rotate unless the design is that of a full-floating bearing. Consequently, when the shaft is always loaded in one given direction, only an arcuate portion of the bearing ring is compressed, and the load on that portion remains substantially constant. Thus there is no appreciable rapid cyclic stress variation on the bearing ring, and consequently fatigue failure is not a problem. Since not over 180° of the ring is under stress it is not essential that the bearing ring extend around the full 360 degrees. However, if the bearing ring does not extend the full 360 degrees care must be exercised in mounting the bearing to assure that the partial ring of bearing material is located between the shaft and the housing at the location of the load. Also, in this event, care must be exercised in the design of the unit to assure that the segment of bearing material is integral with or is secured to the outer race to prevent its movement within the bearing. Also, the outside face of the bearing should be marked to identify the location of the bearing material or to assure that the bearing is mounted properly between the shaft and the housing.

Figure 3:
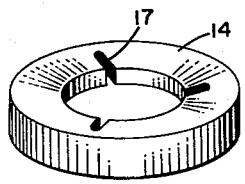
FIGURE 3 is a view showing a separate ring of bearing material before fabrication of the bearing.

In the preferred process of manufacture of the bearing, the inner race 12 is made of steel, and it is made with a high degree of concentricity and with a high degree of surface smoothness where the bearing material is to slide. The inner race should be the substantial equivalent of a rolling contact bearing race as to general size and shape. For maximum performance it is necessary to establish a high degree of perfection of the microgeometry of the inner raceway. This degree of perfection is related to the minimum film expected in operation under the most severe conditions. Under these severe conditions it is necessary that the inner raceway have a microgeometry beyond that normally associated with a precision rolling contact bearing. If the inner race is grooved care should be taken to assure that the arc of the groove is uniform all the way round the periphery. A ring 14 of bearing material as shown in FIGURE 3 is placed around the inner race, and an outer race 13 of steel is placed around the ring of bearing material. The loosely assembled parts are placed in a press, as shown in FIGURE 8, with a supporting shaft 25 through the hole in the inner race. The outer race is supported completely around its periphery by a strong collar or chuck 26. The bearing material is then squeezed between upper and lower jaws 27, 28 to cause the bearing material to flow radially into the groove 16 in the inner race 12. This same technique of forming the bearing material around the bearing race can be used even though the inner race is not grooved. After the removal of the squeezing forces the bearing material remains permanently formed into contact with the inner race. The excellently formed inner race becomes, in effect, a mold for the bearing material, and the bearing material consequently has excellent surface conditions and concentricity where it engaged the inner race. The excellent conditions at the bearing interface contribute in a large measure to the outstanding performance characteristics of the present bearing, as will hereafter be discussed in more detail.

After the bearing material 14 has been squeezed into the groove 16 in the inner race 13 the inner and outer races are locked against axial motion in respect to each other and they may also be virtually locked against rotary motion due to the lack of running clearance at the bearing interface between the bearing material 14 and the inner race. If there is insufficient running clearance it may be established by temporarily deforming either the inner race, or the outer race, or both, within their elastic limit or by radially displacing their position to cause the bearing material 14 to be deformed beyond its elastic limit, thereby to be permanently radially compressed to establish the running clearance. This clearance may be on the order of about .002". In this method it is helpful that the bearing material have a lower elastic limit than the material of the races. It is essential that neither of the races be stressed to a degree that it becomes permanently deformed because such a condition destroys the highly important roundness and geometric accuracy of the races.

The integral outer race means and bearing ring shown in FIGURE 5 may be made of powdered iron or other such material having bearing properties which are sufficiently good for some applications. When such a material is used the outer race 13' and the bearing 14' are simultaneously coined to force the bearing ring 14' into engagement with the surface of the inner race.

It is also possible to use powdered metal such as iron for the outer race and to make the bearing ring of a different metallic base bearing material, in which event it may be preferable to co-coin the outer race and the bearing ring to form the bearing material against the inner race.

FIGURES 9 and 10 show a device for stressing the inner race 12 to thereby stress the bearing material beyond its elastic limit. A chuck 30 tightly engages the outside surface of the outer race 13. A tool 31 is pressed down through the opening in the inner race while it is being rotated. Mounted in the lower end of the tool 31 are three rollers 32 whose periphery extends beyond the periphery of the tool 31 by a slight amount on the order of .010". Means 33 are provided in the tool for adjusting the amount by which the rollers 32 extend beyond the limits of the tool 31. As the tool 31 is rotated and pressed down through the inner race it forcibly distorts the inner race within its elastic limit and it compresses the bearing material 14 between the inner race 12 and the tightly held outer race 13, causing it to be permanently compressed to establish the required running clearance at the bearing interface. After removal of the tool 31 the inner race springs back to its original shape, concentric with the outer race and with the ring of bearing material. The inner face of the bearing material 14 has been burnished against the face of the groove in the inner race 12, thereby giving it an excellent surface geometry for operating as a lubricated bearing interface in co-operation with the groove face.

FIGURE 11 shows a device wherein the inner race 12 is held by a shaft 35. Jaws 36 and 37 press holding and driving rings 38 and 39 tightly against the bearing material ring 14 and virtually fill the annular grooves 40, 41 between the races. Keys 43 secure shaft 35 to the jaws 36, 37 so that the shaft 35 and the entire bearing assembly 12, 13, 14 can rotate as a unit. A roller 45 is pressed against the outer race 13, thereby transmitting a compressive force through the outer race to the inner race and bearing material interface while relative rotation is established between the bearing assembly and the roller 45. This action uniformly squeezes the bearing material beyond its elastic limit, establishing the required small running clearance at the bearing interface. It is also possible to combine the actions of the devices shown in FIGURES 8 and 11 and simultaneously temporarily distort or displace both the inner and outer races, each to a small degree, to establish the required running clearance.

As shown in FIGURE 7, after the running clearance has been established, a lubricant such as oil or grease is added to the bearing. In one form the lubricant is added in the form of oil-soaked cellulose wicking material 18 which fills the annular spaces 42 at each face of the unit and which also fills the slots 17. Thus lubricant is always available at the bearing interface, and as the inner race 12 rotates relative to the stationary bearing ring 14 oil is wiped onto the inner raceway. Seals or oil retainers 20 are then applied.

Some of the reasons why this bearing is much more immune to dirt damage is the presence of the wicking behind the dirt seals. This wicking material provides a dirt filtering action. In the embodiment where a concave groove is present in the inner race an inherent centrifugal lubrication circulation path is established that further precludes foreign material entering the clearance space. This action in combination with the filtering action of the lubrication filled wicking material excludes virtually all foreign material from the bearing interface.

This is in contrast to the inherent action of spherical inner raced rod end bearings and rolling contact bearings all of which tend to induce foreign material into their working surfaces by centrifugal action.

A wide variety of metallic base bearing materials may be used depending upon the application to which the bearing is to be put. It is preferable that the carefully formed inner race be made of a high grade of steel. The outer race may be made of steel or it may be made of sintered powdered iron or other materials to reduce cost or provide other desirable properties. The ring of bearing material may be sintered powdered iron in which event it may be integral with the outer race. However, under the most severe load and speed conditions, the presence of an excellent boundary condition bearing material with high heat transfer capability, combined with the highly refined micro-geometry and other features of this design are required. An outstanding family of materials from which the bearing ring preferably can be made, and meeting the above requirements, is disclosed and claimed in United States Letters Patent No. 3,081,196, issued to Robert J. MacDonald on March 12, 1963. Of the numerous examples disclosed in that patent perhaps the best material is a copper matrix into which is incorporated a lead-oxide base mixture of $SiO_2$ in a range from 1 to 28%. Reference also may be made to U.S. patent application Serial No. 252,937, Robert J. MacDonald, Sintered Rubbing Contact Material and Method for Making Same, for further information on how to make the bearing material.

Powdered aluminum and aluminum alloys also could be used for the bearing ring. A very wide range of bearing materials is available depending upon the service to which the bearing is to be put. Thus, porous bearing materials may be satisfactory for lightly loaded applications. For highly loaded uses the self-lubricating porous materials are unsatisfactory because—under these conditions—such materials will not operate hydrodynamically. For high load applications the bearing material may be porous before it is coined into engagement with the inner race, but after the coining operation the ring should be substantially non-porous.

The single most important problem in the design of a sliding surface, self-contained bearing is its operating temperature. High operating temperatures severely reduce lubricant and seal life, load capacity, and lubrication retention. In addition, high operating temperatures result in thermal expansion problems giving rise to clearance control, and press fit difficulties.

Prior art self-contained bearings have been unable to operate under severe load-speed conditions because of unfavorable ratios of heat generation to heat dissipation factors inherent to their structure and configurations. It is obvious that the configuration of the two races and the bearing ring can be used with a circulating oil system, or in an oil bath where the following factors may have important effects. However, it is in the self-contained configuration of the bearing of the present invention where these factors assume critical significance.

Tests have indicated that minimum coefficient of friction occurs at the maximum load which the bearing can carry hydrodynamically. This indicates that the thinner the oil film the lower the coefficient of friction. The load carrying capacity goes up as the inverse square of the film thickness. In order to achieve low coefficient of friction concurrently with high load carrying capacity it is essential to refine the surfaces of the inner race and the bearing ring at the bearing interface so that the surfaces are extremely accurate, with a minimum surface waviness and lobing as well as having superior surface finish. This accuracy has been called by the Bureau of Standards "micro-geometry." This term includes small irregularities such as surface roughness, and surface waviness as well as the large profile and contour deviations.

Part of this invention includes the discovery that high performance sliding surface bearings are greatly dependent on surface accuracy of the mating parts at the bearing interface, and that certain aspects of this microgeometry affect bearing performance in different ways. Thus, load capacity, vibration, wear, break-in characteristics, friction and heat generation are each affected to different degrees by the various aspects of the microgeometry. A further part of this invention is the discovery that the rate of occurrence or frequency of microgeometry irregularities have large effects on the quality of a sliding surface bearing. Previous work has pointed out the importance of a small segment of micro-geometry on performance, namely surface finish. However, as part of this invention it has been discoverd that bearing performance is not only affected by the finely separated irregularities referred to as surface finish but that the performance is also grossly affected by other frequencies of deviations. As a further discovery of this invention it has been determined that a truly high performance bearing cannot be made if the micro-geometry is above about .000030 of an inch.

In this invention a unique performance level is obtainable within the required dimensional confines of the bearing envelope necessitated by a specific shaft size. This is accomplished by:

(1) Reduction of the diameter of the bearing interface to the limitation imposed only by structural integrity of a one-piece inner race.

(2) By the use of a substantially solid, rigid metal base bearing material of good heat transferability and good boundary characteristics which provides the shortest possible heat transfer path between the bearing interface and the outer race.

(3) Generating satisfactory levels of micro-geometry at the bearing interface such that with a bearing axial length not exceeding that of a comparable rolling contact bearing hydrodynamic operation is maintained at bearing loads of the same order of magnitude.

(4) The ultimate configuration entails the refinement of the interface micro-geometry to the point where hydrodynamic operation can be maintained up to the yield point of the bearing material.

Refinement of the bearing surfaces means that at a given load the oil viscosity can be reduced thereby to minimize friction and reduce the amount of heat generated. With sufficiently refined surfaces even with the use of low viscosity lubricants that decrease heat generation the load carrying capacity and metallic separation is sustained. This means that either the axial length of the bearing can be reduced, or the diameter of the bearing interface can be reduced for a given load, or a combination of both can be employed. Since heat generation goes up as the cube of the diameter of the bearing interface, it is important for high performance bearings to minimize that diameter to further reduce the heat generation. One preferred form of the bearing of the present invention has a groove in its inner race to minimize diameter, provide thrust capability and to lock the assembly together at the bearing interface. The bearing ring operates in this groove with hydrodynamic lubrication on a minimum oil film which is capable of being below .000020".

A good sliding surface bearing cannot be made by merely designing into it low heat generating ability. In addition it is essential that the heat which is generated be effectively taken away, otherwise the operating temperature rises with consequent thinning of the oil. This leads to loss of hydrodynamic operation with consequent increase in friction due to boundary lubricating conditions. Further increase in heat is experienced leading to numerous bearing troubles such as expansion of the bearing material, marginal lubrication, oil deterioration, wear, etc. In an open bearing configuration with circulating oil flow, the lubricant serves to carry away the majority of generated heat. However, in an enclosed bearing configuration heat dissipation becomes one of the critical limiting factors. In the described invention heat dissipation is effectively accomplished at high PV values through use of the substantially solid, high thermal conductivity metallic bearing ring outer race combination. The outer race is in engagement with a metal housing so that the ability to transmit large quantities of heat to the housing is at a maximum. Many of the prior art bearings failed to achieve commercial success due to inadequate provision for heat transfer resulting from:

(1) Wicking material or an air space or the like establishing an insulating blanket between the bearing interface and the outside race.

(2) Failure to provide a material of high thermal conductivity in efficient heat transfer contact within the outer race.

(3) Failure to provide a design where low resistance heat transfer paths exist.

Thus there is provided a sliding surface substantially hydrodynamically lubricated bearing which can have approximately the same size and shape as any one of a very large variety of rolling contact bearings, and wherein the ring of bearing material is in bearing engagement with the raceway of an inner race which is the full equivalent of the raceway of a rolling contact bearing, whether it to be a ball bearing, a tapered, straight or barrel-shaped roller bearing, or any of a wide variety of rolling contact bearings. If the raceway has excellent micro-geometry, and if the bearing face of the ring has excellent micro-geometry, an outstanding sliding surface bearing is achieved. The bearing has low heat generating characteristics and since the ring forms a substantially solid metallic heat transfer path from the bearing interface to the outer race it has excellent heat transfer characteristics.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A self-contained sliding surface substantially hydrodynamically lubricated bearing for use with an axially extending shaft comprising, in combination: an inner bearing race; an annular outer bearing race around and spaced from said inner bearing race; a ring of heat-conducting metallic base material in non-sliding engagement with said outer bearing race and having at least a face of bearing material in closely spaced, sliding surface, bearing interface engagement with a raceway area of said inner bearing race; said ring of metallic base material forming a substantially solid heat transfer path from said bearing interface to said outer race; lubricant slot means in said ring of *metallic base* material, said slot means being located adjacent said bearing interface and extending completely across said bearing interface, sealing means connected between said inner and outer races for substantially sealing said bearing interface against dirt, and lubricant means contained within said bearing by said sealing means and located at least in part within said lubricant slots for lubricating said bearing interface.

2. A sliding surface substantially hydrodynamically lubricated bearing as set forth in claim 1, further characterized by said raceway having microgeometry on the order of .000030 of an inch.

3. A sliding surface substantially hydrodynamically lubricated bearing as set forth in claim 1, further characterized by said ring of metallic base material being comprised of metallic base bearing material.

4. A sliding surface substantially hydrodynamically lubricated bearing as set forth in claim 1, further characterized by said sealing means and said inner and outer race means forming an enclosure for said ring of metallic base material, and said means for lubricating said bearing being within said enclosure and in engagement with said inner raceway at said slots for lubricating same.

5. A sliding surface substantially hydrodynamically lubricated bearing as set forth in claim 4, further characterized by said lubricating means comprising oil soaked wicking material in said slots and substantially filling said enclosure.

6. A self-contained sliding surface substantially hydrodynamically lubricated bearing comprising, in combination: an inner bearing race and an annular outer bearing race around and spaced from said inner bearing race; a ring of heat conductive metallic base material having at least a face of bearing material in sliding surface bearing interface engagement with one of said bearing races and connected to said other race to form a substantially solid heat transfer path from said bearing interface to said other race; lubricant slot means in said ring of *metallic base* material, said slot means being located adjacent said bearing interface and extending completely across said bearing interface, sealing means connected between said inner and outer races for substantially sealing said bearing interface *against* dirt, and lubricant means contained within said bearing by said sealing means and located at least in part within said lubricant slots for lubricating said bearing interface.

7. A sliding surface substantially hydrodynamically lubricated bearing for use with an axial extending shaft comprising, in combination: an inner bearing race which is a surface of revolution; an annular outer bearing race around and spaced from said inner bearing race, one of said races having a bearing face having microgeometry on the order of .000030 of an inch; a ring of metallic base bearing material connected to one of said bearing races and being closely spaced from the said bearing face to establish with said other race at said bearing face a sliding surface interface which, when said bearing is running, has a substantially hydrodynamically oil lubricated condition, wherein the oil film is on the order of .000020 of an inch thick, said ring of bearing material having axially extending oil slots at said interface and forming a substantially solid heat transfer path from said bearing interface to said one race; oil means within said slots for lubricating said bearing interface; and means at each axial end of said bearing for substantially sealing in said oil and sealing said bearing interface against dirt.

8. A sliding surface substantially hydrodynamically lubricated bearing as set forth in claim 7, further characterized by said bearing material being formed of sintered metallic base material and being substantially non-porous whereby there may be achieved high pressures in the lubricant at said bearing interface due to hydrodynamic lubrication, thereby to greatly increase the load carrying capacity of the bearing compared to bearings having sintered porous bearing material.

9. A sliding surface substantially hydrodynamically lubricated bearing as set forth in claim 7, further characterized by lubricant impregnated wicking material substantially filling said slots and in engagement with the face of said inner bearing race member means for applying lubricant to said bearing interface.

10. A sliding surface substantially hydrodynamically lubricated bearing as set forth in claim 7, further characterized by grease substantially filling said slots and in engagement with the face of said inner bearing race member means for applying lubricant to said bearing interface.

11. A self-contained sliding surface substantially hydrodynamically lubricated bearing for use with an axial extending shaft comprising, in combination, inner bearing race member means the outer face of which has a circumferential groove therein which in cross-section is a single surface of revolution formed about a center located outside of said race member, annular outer bearing race member means around said inner bearing race member means, a ring formed of metallic base bearing material located between said inner and outer races and extending into said groove, establishing with said inner race a bearing interface for radial and thrust loads, the two faces of said bearing interface being spaced from each other by a small carefully controlled, finite distance to establish hydrodynamic lubrication at said interface as said bearing operates, lubricant slot means in said ring of bearing material, said slot means being located adjacent said bearing interface and extending completely across said bearing interface, sealing means connected between said inner and outer races for substantially sealing said bearing interface against dirt, and lubricant means contained within said bearing by said sealing means and located at least in part within said lubricant slots for lubricating said bearing interface.

12. A self-contained sliding surface substantially hydrodynamically lubricated bearing for use with a rotatable shaft comprising, in combination, an inner bearing race to be connected to said shaft to rotate therewith, an outer bearing race around said inner bearing race and spaced therefrom, said inner race having a groove in its outer face, a ring of heat conductive metallic base bearing material connected to said outer race and in axially interlocked sliding surface bearing relation in respect to the groove portion of the inner race and with said bearing material spaced from the wall of said groove by a small carefully controlled, finite distance to establish a bearing interface and to establish hydrodynamic lubrication between said inner race and said bearing material as said bearing operates, lubricant slot means in said ring of bearing material, said slot means being located adjacent said bearing interface and extending completely across said bearing interface, said inner and outer races extending axially of said shaft a greater distance than said ring of bearing material forming two annular spaces defined by said races and said bearing material, lubricating material in said spaces and in said lubricant slot means, said lubricant slot means interconnecting said two annular spaces, and means mounted between said inner and outer bearing races to hold said lubricating material in said spaces.

13. A sliding surface substantially hydrodynamically lubricated bearing for use with a shaft as set forth in claim 12, further characterized by said ring of bearing material being an integral, one-piece, annulus.

14. A sliding surface substantially hydrodynamically lubricated bearing for use with a shaft as set forth in claim 12, further characterized by said ring bearing material comprising a plurality of sections.

References Cited by the Examiner

UNITED STATES PATENTS

| | | | |
|---|---|---|---|
| 718,141 | 1/1903 | Monson et al. | 308—36 |
| 881,471 | 3/1908 | Hoffmann | 29—148.4 |
| 2,127,854 | 8/1938 | Bath et al. | 308—121 |
| 2,611,665 | 9/1952 | Derbyshire | 308—161 X |
| 2,704,230 | 3/1955 | Roschlau | 308—36 X |
| 2,764,433 | 9/1956 | Cobb | 308—187.2 |
| 2,804,679 | 9/1957 | Tracy | 29—149.5 |
| 3,049,789 | 8/1962 | Heim | 29—149.4 |
| 3,086,826 | 4/1963 | Gunnell | 308—37 |
| 3,118,710 | 1/1964 | Hamel | 308—37 |

DAVID J. WILLIAMOWSKY, *Primary Examiner.*

FRANK SUSKO, *Examiner.*